Feb. 28, 1961    B. INGRAO    2,973,411

SUPPORTS FOR TELEPHONE HAND SETS

Original Filed Feb. 25, 1955

INVENTOR.
Benedict Ingrao
BY John F. Brezina
Attorney

United States Patent Office 2,973,411

Patented Feb. 28, 1961

2,973,411

SUPPORTS FOR TELEPHONE HAND SETS

Benedict Ingrao, 2435 N. 73rd Ave., Elmwood Park, Ill.

Original application Feb. 25, 1955, Ser. No. 490,641. Divided and this application Dec. 9, 1957, Ser. No. 701,374

6 Claims. (Cl. 179—146)

This invention relates to novel supports adapted for use in connection with telephone hand sets or the like, and is particularly directed to novel easily mountable brackets, supports and hangers adapted for use on or adjacent to telephone.

This application is a division of my co-pending application for patent, Serial No. 490,641, filed February 25, 1955.

It is an object of my invention to provide novel supports for telephone hand sets and the like which have novel means thereon for mounting the same with respect to telephone boxes, or with respect to supporting walls or panels, and which have upwardly and outwardly extending brackets and holders upon which a telephone hand set may be rested, especially during intervals when the normal connection switch is to remain closed in communicating and talking position.

It is a further object of my invention to provide novel easily mountable brackets and holding devices for telephone hand sets and which have quickly mountable means for securing the same to telephone wall boxes or wall plates, and which have depending hangers and hooks thereon adapted to receive hand sets or the like.

Other and further important objects of my invention will be apparent from the following description and appended claims.

Numeral 10 designates the typical telephone wall box made of metal which is normally secured to a wall by a plurality of screws or bolts (not shown). Said box has integral parallel side walls as shown, and a front wall 11 as indicated.

Figure 3:
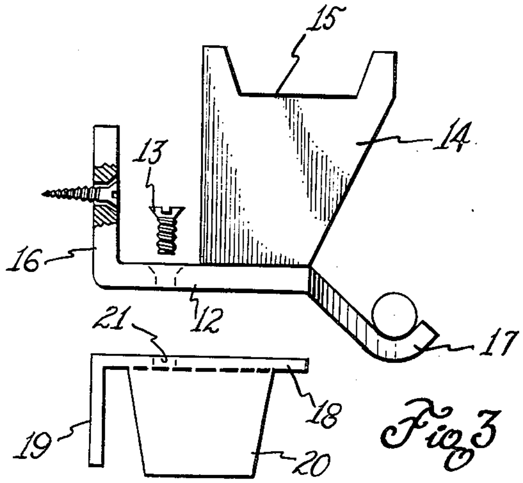
Fig. 3 is an enlarged exploded elevational view of a modified form of my device and illustrating the means for engaging the upper portion of a wall mounted telephone box or wall mounted plate and the means for supporting a hand set.

Numeral 12 designates a mounting plate which is preferably apertured at two spaced apart points, as indicated in Fig. 3, said apertures being adapted to receive releasably threaded screws 13, one of which said screws is illustrated in Fig. 3. Said screws 13 are adapted to threadingly engage suitable spaced holes in the top of the telephone box 10, to thereby mount my device in the manner illustrated.

Figure 1:
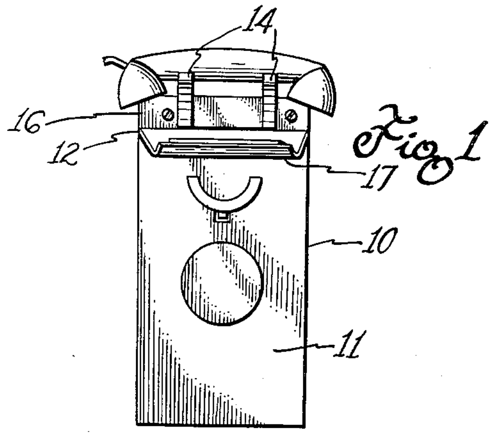
Fig. 1 is a front elevational view of a telephone wall bracket having my hand set supporting means mounted thereon, and illustrating the hand set in the position in which it is normally temporarily placed during maintenance of communicative connection.
Figure 2:
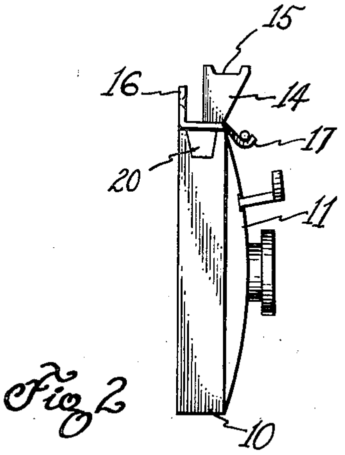
Fig. 2 is a side elevational view thereof looking at the left hand side of Fig. 1.

A pair of upwardly extending plate-like brackets 14 are gradually enlarged and widened toward the upper ends and have their lower edge portions suitably secured, for example by welding, to the upper face of the mounting plate 12, said brackets being spaced apart a short distance as indicated in Fig. 1. Each of said brackets has an upwardly opening recess 15, which is partially defined by a lower substantially horizontal straight edge as indicated. Said recesses 15 are of a width slightly greater than the transverse dimension of a telephone hand-set, so that such hand-set may be quickly and easily releasably positioned and held in said recesses 15 in the manner as illustrated in Fig. 1.

Numeral 16 designates an upwardly extending flange, which is preferably integral with the horizontally extending mounting plate 12. Said flange 16 preferably has two spaced apart holes therein, through which suitable screws are extended to engage a stationary wall or the like, to thereby provide an optional additional means of securing my device in the prescribed and illustrated position.

The forward edge portion of the mounting plate 12 carries a downwardly and upwardly inclined lip or trough 17 which may optionally be formed integral with said plate 12, said extension or lip 17 providing a convenient holding means for a pencil or other writing instrument.

Numeral 18 designates a substantially right angled auxiliary metal bracket which has a depending leg 19 which is adapted to be inserted by downward pressure in the space between the rear part of a conventional 'phone box and the adjacent wall. Said auxiliary bracket 18 has a pair of depending extensions or lugs extending downwardly from its opposite ends, said end lugs being preferably formed integral with the auxiliary bracket 18 and being bent downwardly and at right angles to the plane of said auxiliary bracket. The length of the auxiliary bracket 18 and the distance between the inner faces of the depending lugs 20 is substantially equal to the width of a conventional wall box, so that said depending lugs or extensions 20 will frictionally engage the opposite sides of a telephone box when said auxiliary bracket is placed on the top of such wall boxes. Said auxiliary bracket 18 is provided with a pair of suitably spaced holes 21 which correspond to the positioning and spacing of the screws 13, so that said screws 13 will threadingly engage said holes 21 when the mounting plate and its attached parts are secured in position upon the said auxiliary bracket 18. I desire it to be understood that said auxiliary bracket 18 may be omitted entirely in instances where it is possible to mount the mounting plate 12 and the parts carried thereby directly to the top of a 'phone box, for examples as illustrated in Fig. 1.

Figure 4:
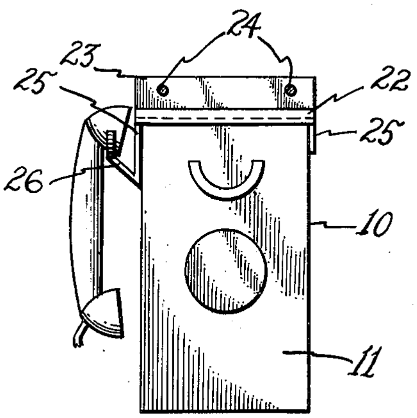
Fig. 4 is a front elevation of a modified form of my hand set hanger embodying an integral depending hook illustrated as mounted on a wall mounted telephone box.
Figure 5:
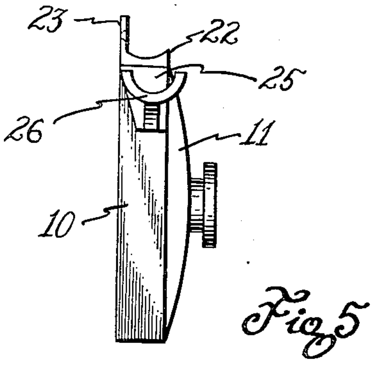
Fig. 5 is a side elevational view thereof looking at the left hand side of Fig. 4.

In Figs. 4 and 5 I have illustrated a modified form of my invention in which a transversely extending bracket having a lower mounting plate 22 and an integral apertured upwardly extending leg or flange 23, is removably mounted upon a conventional telephone wall box. In this form the upwardly extending apertured flange 23 may be additionally secured with respect to the adjacent wall by a pair of screws 24, as illustrated in Fig. 4. Said bracket as illustrated in Figs. 4 and 5 has a pair of depending lugs 25 formed integral with its opposite ends and which are so spaced apart that the same will frictionally and releasably engage the opposite side walls of a standard wall box.

Formed integral with left hand depending lug 25 is a suitable metal hook 26 whose upper end is forked or bifurcated to facilitate hanging thereon of the enlarged portion of a hand-set in the manner illustrated in Fig. 4. A telephone hand-set is adapted to be easily and quickly hung on hook 26 during temporary periods, for example when additional persons are called to answer the 'phone or during periods when the user finds it necessary to use both hands for other purposes. It will be understood that said modified form of my device illustrated in Figs. 4 and 5 is adapted to be quickly and easily mounted by downward pressure on the upper end portion of a conventional wall box, in which position it will normally be held by the aforesaid frictional engagement of lugs 25 with the side walls of said box.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. A support for telephone hand sets adopted to be attached to a telephone wall box and comprising a mounting plate having integral spaced apart depending lugs at the edges of said plate; a pair of horizontally spaced upwardly extending bifurcated brackets connected at their lower ends to said mounting plate and having portions thereof extending outwardly of said mounting plate; said upwardly extending bifurcated brackets being adapted to receive a telephone hand set, said lugs being adapted to releasably engage the upper end portion of a telephone wall box to thereby hold said support upon said telephone wall box.

2. A device for supporting telephone hand sets adapted to be attached to a telephone wall box and comprising an apertured mounting plate, integral spaced apart depending lugs on the edges of said plate; a pair of horizontally spaced upwardly extending bifurcated plates connected at their lower ends to said mounting plate; said apertured mounting plate anad said lugs being adapted to releasably and frictionally engage the upper portion of a telephone wall box to thereby hold said device upon said wall box.

3. A device for supporting hand sets adapted to be attached to a telephone wall box as recited in claim 2 and having a vertically extending apertured flange connected to its rear edge, said flange being adapted to receive screws or the like to secure said device with respect to a wall.

4. In a device for supporting hand sets or the like adapted to be quickly mounted with respect to a wall box, a transversely extending apertured plate having a rearwardly extending apertured flange on said plate; a pair of upwardly extending horizontally spaced apart brackets connected at their lower ends to said mounting plate, each of said brackets having an upwardly opening recess therein; a plurality of depending extensions on the edges of said mounting plate and adapted to engage the upper portion of a wall box; and releasable means for engaging the upper portion of said wall box to secure said plate thereto.

5. A device for holding telephone hand sets adapted to be attached to a telephone wall box and comprising an apertured upper mounting plate, said plate having integral extensions thereon; a pair of horizontally spaced upwardly extending brackets on said mounting plate, said brackets having upwardly opening recesses; a second angular apertured mounting plate having integral depending lugs adjacent its end portions, said lugs being adapted to engage the sides of a telephone wall box; and screws means for connecting together said first mounting plate and said second mounting plate.

6. A device for releasably holding telephone hand sets and adapted to be attached to a telephone wall box and comprising a mounting plate having spaced apart apertures therein; an integral upwardly extending flange on the rear edge of said mounting plate; a pair of horizontally spaced apart brackets secured on the forwardly extending portion of said mounting plate, the upper end of each of said brackets being bifurcated to provide a recess adapted to receive the intermediate portion of a hand set, said mounting plate being mountable on the upper portion of a telephone wall box.

No references cited.